June 28, 1955  T. DAUGHERTY  2,711,685
FRYING UTENSIL
Filed Oct. 25, 1951
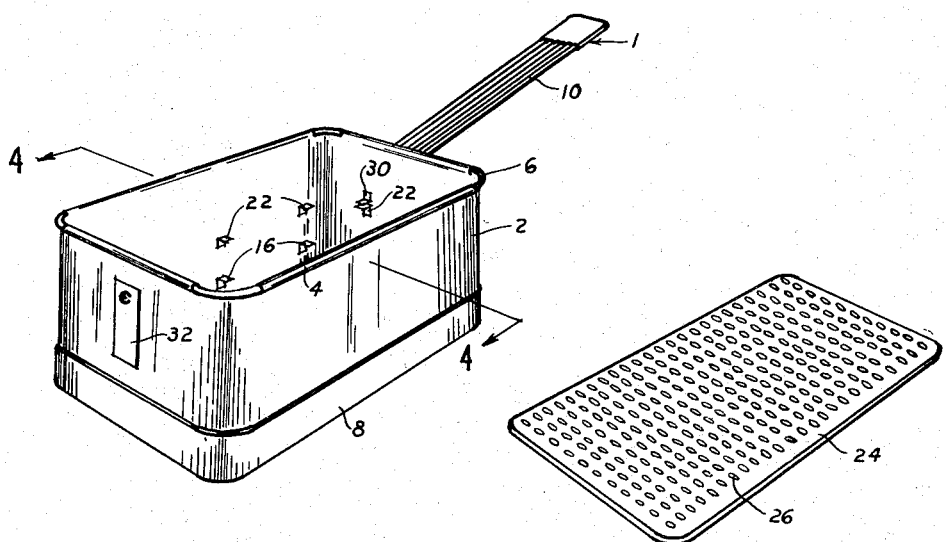
Fig. 1.
Fig. 2.
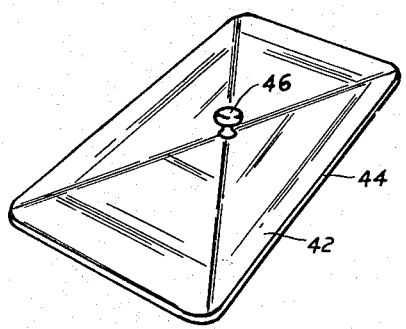
Fig. 3.
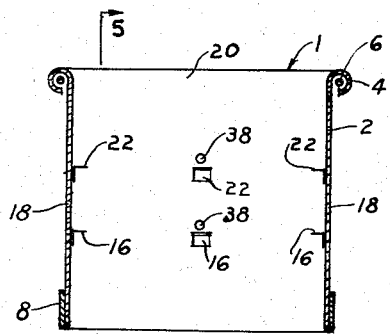
Fig. 4.
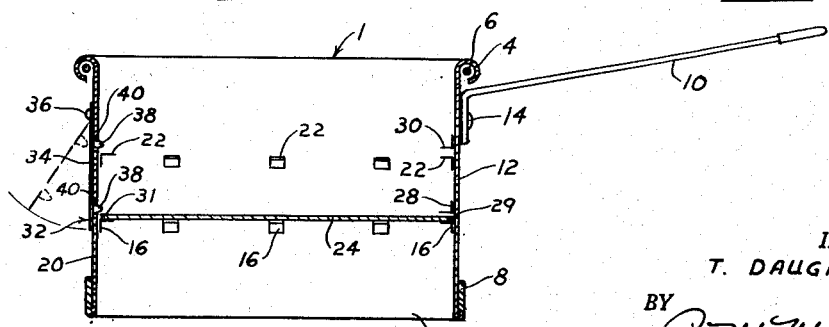
Fig. 5.
INVENTOR.
T. DAUGHERTY
BY
ATTORNEY United States Patent Office 2,711,685
Patented June 28, 1955

2,711,685

FRYING UTENSIL

Thomas Daugherty, Tulsa, Okla.

Application October 25, 1951, Serial No. 253,169

2 Claims. (Cl. 99—410)

This invention relates to improvements in cooking utensils and more particularly, but not by way of limitation, to an improved frying utensil for use in deep fat fryers.

As it is well known, a large portion of the commercial frying is accomplished by use of a deep fat fryer and a wire mesh type fry basket. The food to be fried is placed in the basket and means are provided to support the basket in a deep fat fryer in such a position that the basket is completely submerged in the hot fat or grease provided in the deep fat fryer. The wire mesh type basket permits the hot oils and fats to circulate through and over the foods being cooked. In this manner, a maximum crispness is provided which is very desirable in the cooking of vegetables, as well as fish.

The usual temperature of the cooking fat is in the neighborhood of 375 degrees Fahrenheit when cooking vegetables in order to produce the desired crispness. However, when meat or fowl is cooked in a wire basket at this temperature, all of the natural juices are driven out of the food, leaving a well done layer on the outside and an uncooked center. Therefore, the temperature of the cooking fat must be lowered to a temperature of around 325 degrees Fahrenheit when frying meat or fowl. Obviously, a considerable amount of time is consumed in varying the temperature of the cooking fat when changing from one frying operation to another, and the cooking time for meat and fowl is unduly extended. Furthermore, when meat or fowl is completely submerged in the cooking fat, most of the moisture is driven out of the food, resulting in substantial shrinkage.

The present invention contemplates a novel frying utensil in the form of a solid wall bottomless container which may be partially submerged in the cooking fat of a deep fat fryer. A vertically adjustable perforated tray is provided in the container to support the food being fried, and the container is provided with a substantially air tight lid or cover. When frying vegetables or fish, the perforated tray is supported at a low level in the container in such a manner that the food is completely submerged in the cooking fat. It will then be apparent that the vegetables or fish will be fried in substantially the same manner as when using a wire mesh type fry basket. When it is desired to fry meat or fowl, however, the perforated tray is supported at a higher level in the container in such a manner that the food is only partially submerged in the cooking fat. The temperature of the cooking fat need not be lowered. As the meat or fowl is being fried, the cooking odors and steam given off by the food will be confined in the upper portion of the container by the air tight lid. In this manner, the flavor is in effect driven back into the food, and the steam, in being retained in the direct vicinity of the food, substantially reduces the shrinkage of the food. In addition, the steam penetrates the food to induce an even cooking of the food all the way through in a minimum of time.

An important object of this invention is to increase the speed at which meat and fowl may be fried in commercial establishments.

Another object of this invention is to reduce the shrinkage of meat and fowl being cooked in a deep fat fryer.

Another object of this invention is to provide a frying utensil whereby meat and vegetables may be cooked in a deep fat fryer at the same temperature.

A further object of this invention is to enhance the flavor of food, particularly meat and fowl, being fried in a deep fat fryer.

A still further object of this invention is to provide an improved frying utensil which may be utilized when frying either meat or vegetables in a deep fat fryer and which may be economically manufactured.

Other objects and advantages of the invention will be evident from the following detailed description, read in conjunction with the accompanying drawings, which illustrate my invention.

In the drawings:

Figure 1 is a perspective view of a novel container utilized in deep fat frying.

Figure 2 is a perspective view of a perforated tray for the container shown in Fig. 1.

Figure 3 is a perspective view of a lid or cover for the container shown in Fig. 1.

Figure 4 is a cross sectional view taken along lines 4—4 of Fig. 1.

Figure 5 is a cross sectional view taken along lines 5—5 of Fig. 4.

Referring to the drawings in detail and particularly Fig. 1, reference character 1 generally designates a novel frying utensil comprising a solid wall bottomless container 2. The container 2 is substantially rectangular in configuration and is preferably formed out of a light weight metal. The upper edges 4 of the container 2 are rolled outwardly and downwardly around a supporting rod 6, as is more clearly shown in Figs. 4 and 5. The lower edges 8 of the container 2 are bent outwardly and upwardly to form a hem. The lightweight container 2 is therefore adequately reinforced to withstand the usual relatively rough handling given cooking utensils.

A suitable handle 10 is secured to one end wall 12 of the container 2 by suitable bolts or rivets 14 to facilitate the manipulation of the container 2. The container 2 is constructed of such a size that it may be readily inserted into the usual deep fat fryer (not shown) and be partially submerged in the cooking fat contained in the deep fat fryer.

As clearly shown in Figs. 4 and 5, a lower row of clips or lugs 16 are provided on the inner side of each of the side walls 18 of the container 2. The clips 16 are secured to the side walls 18 in any suitable manner, such as by spot welding, and are disposed in horizontal alignment. In addition, one clip 16 is secured to the inner side of each of the end walls 12 and 20 of the container 2 in horizontal alignment with the rows of clips 16 on the side walls 18. A second row of clips or lugs 22 are secured to the inner side of each of the side walls 18 in upwardly spaced relation to the clips 16. In addition, a clip 22 is secured on the inner side of each of the end walls 12 and 20 in horizontally aligned relation with the rows of clips 22 on the side walls 18.

The clips 16 and 22 are provided to selectively support a tray 24 shown in detail in Fig. 2. A plurality of apertures 26 are provided in the tray 24 to permit movement of the hot cooking fat or oil upwardly into container 2 when the container is inserted in a deep fat fryer.

A clip 28 (Fig. 5) is secured to the end wall 12 a short distance above the respective end clip 16 to cooperate with said clip 16 in fastening one end 29 of the tray 24 when the tray is disposed on the clips 16. A clip 30 is similarly secured to the end wall 12 above the respective end clip 22 to secure the end 29 of the tray 24 when the tray is disposed on the upper clips 22. The opposite end 31 of the tray 24 is secured by a fastening device 32 when disposed on either the clips 16 or 22.

The fastening device 32 comprises a resilient plate 34 secured by a rivet or bolt 36 to the end wall 20 above the upper clips 22. Two vertically spaced projections 38 are provided on the inner face of the plate 34 and are adapted to project through complementary apertures 40 provided in the end wall 20. When the plate 34 is in a vertical position as shown in full lines in Fig. 5, the projections 38 extend into the container 2 above the adjacent end clips 16 and 22. It will be apparent that the projections 38, cooperating with the respective end clips 16 and 22, fasten the end 31 of the perforated tray 24 when the tray is disposed on either the clips 16 or 22. When it is desired to remove the tray 24 from the container 2, the plate 34 may be sprung outwardly as shown in dotted lines in Fig. 5, to permit raising of the end 31 of the tray 24. The end 29 may then be moved from underneath the clips 28 or 30 and the tray 24 freely removed from the container 2.

A lid or cover 42 (Fig. 3) is provided to close off the upper portion of the container 2. The outer edges 44 of the lid 42 are turned downwardly and are adapted to fit tightly over the rolled upper edges 4 of the container 2 to provide a substantially air tight fit of the lid 42 on the container 2. A knob 46 is provided in the central portion of the lid 42 to facilitate the manipulation thereof.

*Operation*

When it is desired to fry meat or fowl, the perforated tray 24 is inserted in the container 2 onto the upper clips 22 and is fastened thereon by the clip 30 and fastening device 32. The meat or fowl is then placed on the tray 24, and with the lid 42 in place on the container 2, the container is placed into a deep fat fryer. The container 2 is arranged in the deep fat fryer at such a height that the meat or fowl will be only partially submerged in the hot cooking fat.

During the cooking operation, the steam and odors given off by the meat or fowl will be retained within the upper portion of the container 2 by the lid 42. In this manner, the meat or fowl will be subjected to two cooking mediums, i. e., the hot cooking fat and the steam that is retained in the upper portion of the container 2. The steam will effectively penetrate the meat or fowl to provide a thorough cooking thereof, as well as precluding a drying up or shrinking of the food. In addition, the flavors given off by the food will be carried back into the food by the steam to enhance the palatability of the cooked food. Furthermore, since the steam provides an even cooking of the food, the temperature of the cooking fat may be relatively high to provide a fast cooking.

When the meat or fowl has been thoroughly fried, the lid 42 may be removed and the container 2 removed from the deep fat fryer. The container 2 is preferably held or supported above the deep fat fryer to permit the excess grease or fat to drain off the food and through the perforated tray 24, whereupon the container 2 may be inverted to discharge the cooked meat or fowl into any desired receptacle (not shown). It will be apparent that the upper projection 38 of the fastening device 32 and the clip 30 will preclude an inadvertent removal of the tray 24 upon inversion of the container 2.

When it is desired to fry vegetables or fish, the tray 24 is inserted in the container 2 onto the lower clips 16.

The vegetables or fish are then placed on the tray 24 and the container 2 is inserted into a deep fat fryer. The lid 42 need not be used. The container 2 is placed in the deep fat fryer in such a position that the vegetables or fish will be completely submerged in the cooking fat. The fat or grease will then fry the vegetables or fish in the usual manner. The cooking fat may be retained at a constant temperature for all cooking operations. The container 2 is then removed from the deep fat fryer and the cooked food is removed from the container 2 in the same manner as set forth above.

From the foregoing it is apparent that the present invention provides a novel frying utensil that may be utilized when frying either meat or vegetables in a deep fat fryer. The palatableness of the food, particularly meat or fowl, is enhanced and the shrinkage of the food is reduced to a minimum. Furthermore, meat and vegetables may be fried at the same temperature when the present utensil is utilized. It will also be apparent that the present utensil may be economically manufactured.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A utensil for use in a deep fat fryer, comprising a solid wall bottomless container of a size to be partially submerged in the cooking fat of a deep fat fryer, a perforated tray, a pair of vertically spaced rows of clips secured in the container to selectively support the tray in the container at various heights in the fat, said container having an aperture in one side wall thereof above and in proximity with each row of clips, fastening means for securing the tray on the clips, said fastening means comprising a resilient plate secured at one end to the outer face of the container and having a pair of spaced projections of a size to project through said apertures above the tray, a lid for the container to preclude the escape of steam and cooking odors therefrom, and a handle on the container.

2. A cooking utensil for use in a deep fat fryer, comprising a solid wall bottomless container of a size to be partially submerged in the cooking fat of the fryer, a perforated tray, a plurality of pairs of vertically spaced rows of clips secured in the container to selectively support the tray in the container at various heights, an aperture in one side wall of the container above and in proximity with each pair of rows of clips, fastening means including a resilient movable plate secured to the outer face of the container and having projections extending through said apertures, cooperating with the clips in securing the tray on a selected row of clips, and a lid on the container to preclude the escape of steam and cooking odors therefrom.

References Cited in the file of this patent

UNITED STATES PATENTS

| | | |
|---|---|---|
| 523,643 | Pack | July 24, 1894 |
| 721,404 | Wege | Feb. 24, 1903 |
| 1,025,630 | Krogoll | May 7, 1912 |
| 1,460,975 | Miller et al. | July 3, 1923 |

FOREIGN PATENTS

| | | |
|---|---|---|
| 306,627 | Great Britain | Feb. 28, 1929 |